United States Patent [19]

Piper et al.

[11] 3,985,460

[45] Oct. 12, 1976

[54] FRAME SEAT AND MECHANISM FOR JOINING FRAME PORTIONS THEREOF

[75] Inventors: Peter D. Piper; Kent W. Bouldin, both of Dallas, Tex.

[73] Assignee: Peter Piper Plastics, Inc., Dallas, Tex.

[22] Filed: Oct. 22, 1975

[21] Appl. No.: 624,644

[52] U.S. Cl. .............................. 403/234; 297/457; 403/190
[51] Int. Cl.² ........................................ F16L 41/00
[58] Field of Search ................. 297/1, 3, 130, 445, 297/450, 457; 285/397; 403/205, 234, 237, 247, 248, 257, 260, 292–295, 297, 298, 314, 405, 408, 190

[56] References Cited
UNITED STATES PATENTS

| | | | |
|---|---|---|---|
| 3,598,433 | 8/1971 | Savickas | 297/445 X |
| 3,650,563 | 3/1972 | Hansson et al. | 297/457 X |
| 3,713,677 | 1/1973 | Dupreez | 403/297 X |

FOREIGN PATENTS OR APPLICATIONS

| | | | |
|---|---|---|---|
| 1,098,576 | 3/1955 | France | 297/445 |
| 839,041 | 6/1960 | United Kingdom | 297/445 |

*Primary Examiner*—James C. Mitchell
*Attorney, Agent, or Firm*—Fleit & Jacobson

[57] ABSTRACT

The invention provides a seat comprised of spaced rectangular frame members formed of tubular plastic, the frame members being held together by at least three tubular cross members which join to the frame members by means of mechanical pressure fitting. Around the cross member is provided a webbing in a triangular-fashion. The seat has two positions, or seating modes, effected by a rotation of 90°.

The mechanical pressure fittings comprise an expansible shaft having an outside diameter substantially the same as a tube into which it resides. The shaft is expanded by rotating a bolt which associates the shaft with an expansion wedge. The fitting further connects to a second tube transverse to the first, through the means of the same bolt and while avoiding compression of the second tube by way of an internal spacer element.

10 Claims, 7 Drawing Figures

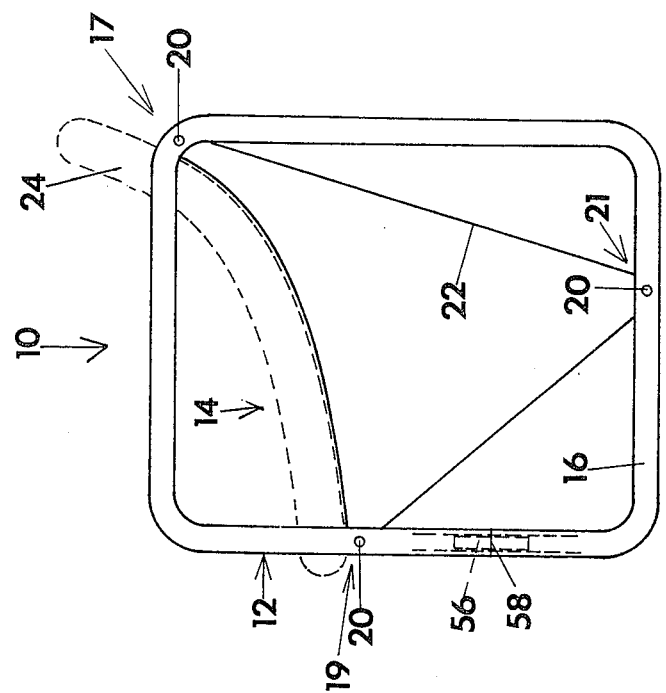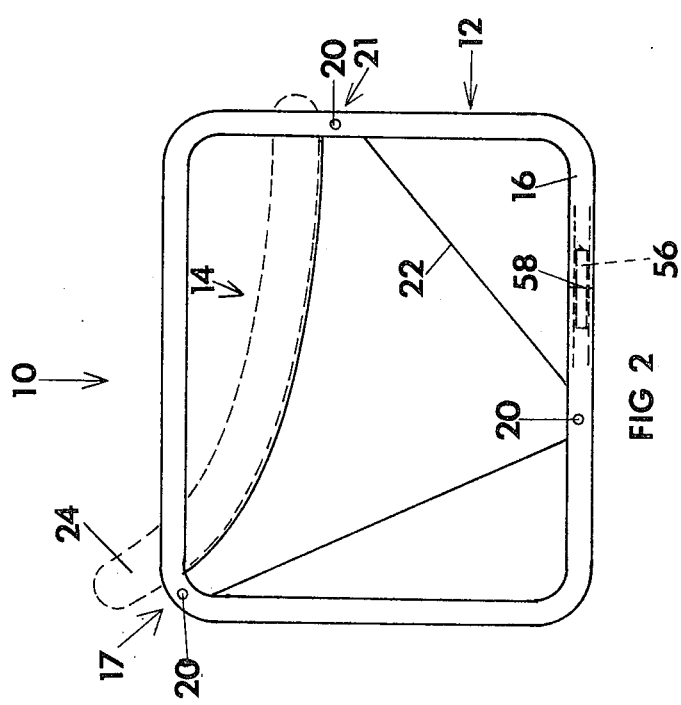

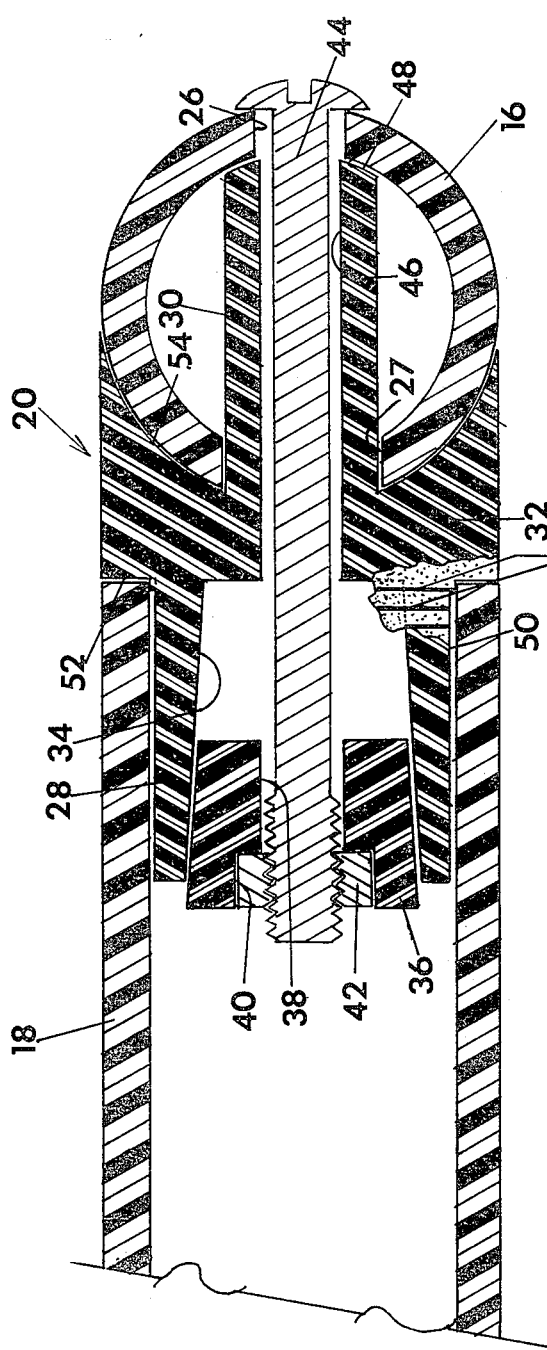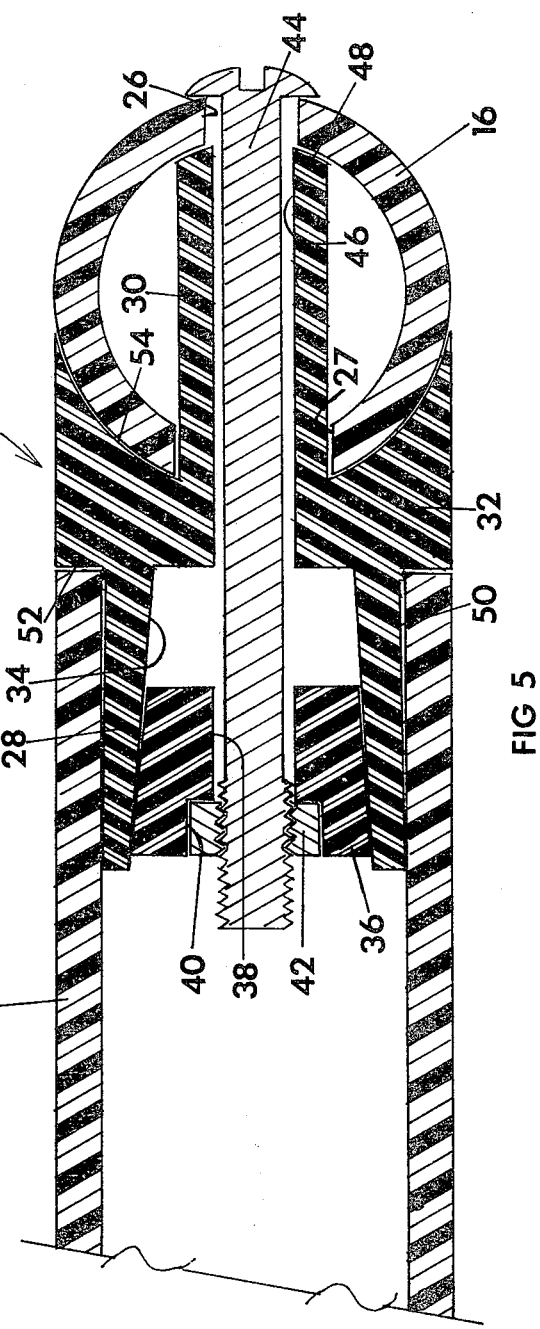

FRAME SEAT AND MECHANISM FOR JOINING FRAME PORTIONS THEREOF

BACKGROUND AND SUMMARY OF THE INVENTION

The invention relates to seats, and particularly those having a dual purpose capability, which are convertible without structural alteration into modes useful either for lounging or for more erect seating. The invention further provides a screw-tightened pressure fitting useful for joining tubular members, particularly hollow plastic members, at right angles to each other.

Chairs previously available to consumers have generally not been designed such that the structure could be used for more than one purpose. The present invention provides such a chair, the chair having a tubular frame formed of two spaced rectangular frame members and at least three cross members for holding the frame members together. The cross members join to the frame members at 90° angles, and hence the invention also provides a screw-operated pressure fitting which connects the hollow plastic tubular members and which evenly distributes the stresses developed during such connection in order to minimize the possibilities of fracture of the tubular members.

It is therefore an object of the invention to provide a seat which is convertible to at least two seating modes without structural modification.

It is a further object of the invention to provide a mechanical connector for joining tubular members, especially plastic tubular members, at 90° angles to each other without stress.

Further objects and advantages of the invention will become more readily apparent in light of the following description of the preferred embodiments.

BRIEF DESCRIPTION OF THE DRAWINGS

FIG. 2 is a side elevation of the chair shown in FIG. 1, and in the same mode;

FIG. 3 is a side elevation of the chair in its second utility mode effected by a 90° reorientation of the chair from the orientation of FIGS. 1 and 2;

FIG. 4 is an elevation in section of the mechanical connector used to join the elements of the tubular framework, with the connector relaxed;

FIG. 5 is an elevation in section of the connector of FIG. 4 once tightened;

DESCRIPTION OF THE PREFERRED EMBODIMENTS

Figure 1:
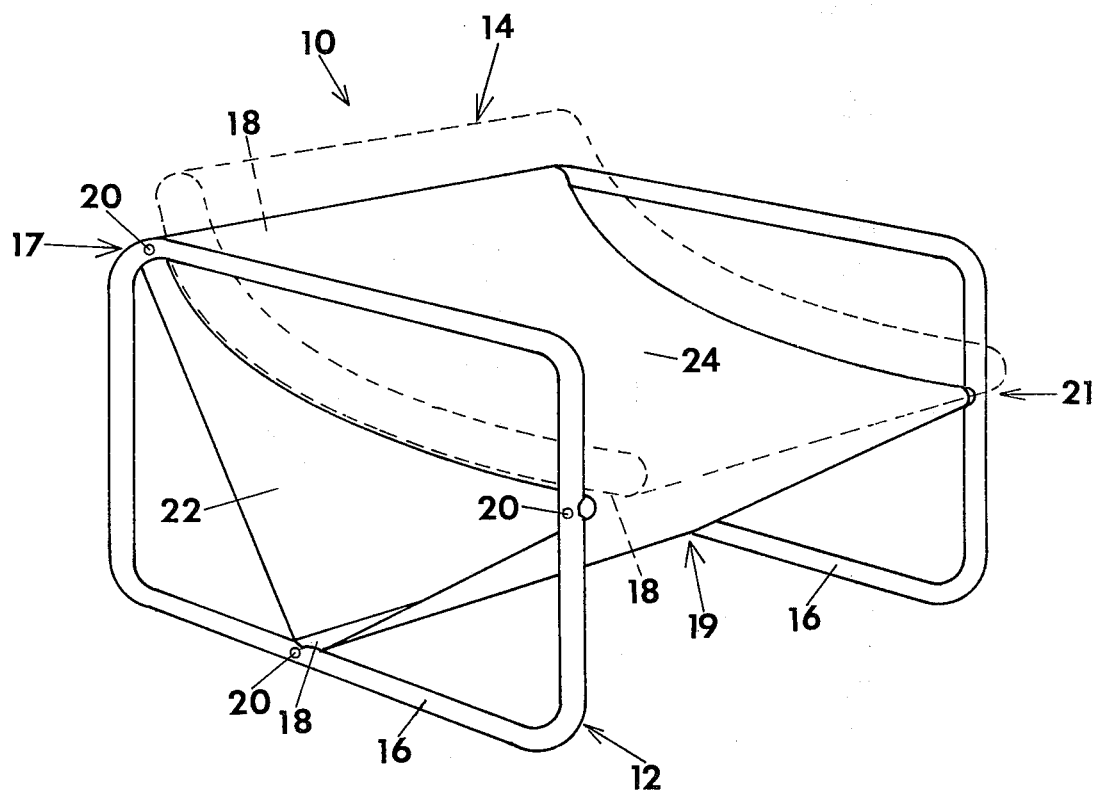
FIG. 1 is a perspective view of the present seat, in the form of a chair, and in one of its utility modes.

The invention provides a rugged, lightweight seat shown generally at 10 in FIGS. 1 through 3 in the form of a chair. Chair 10 is comprised of a frame 12 and a seating section 14. The frame 12 is formed of tubular plastic side frame members 16 and three cross members 18. The side frame members 16 are rectangular while the cross members 18 are straight tubular structures. The cross members 18 connect to the frame members 16 at selected points on the frame members 16, and are joined thereto by pressure fitted connectors 20 which will be described in detail hereinafter. The connectors 20 join the members 16 and 18 together at right angles in a manner which distributes the stresses on the resulting joint over the full cross-sectional area of the members 16 and 18. Local stress concentrations are thereby prevented which could cause the plastic tubular members 16 and 18 to shatter or fracture.

As illustrated, three cross members 18 are used to connect the two spaced side members 16. One of the cross members 18 extends between opposed corners of the rectangular frame members 16. These corners are shown at 17. The second of the cross members 18 associates with regions on the longer sides of the tubular rectangle, shown generally at 19. These regions 19 of connection on the frame members 16 are preferably near the mid-points of the respective sides of the members 16 but nearer the corners 17 of the frame 12. The third of the cross members 18 joins regions 21 on the shorter sides of the tubular rectangle. These regions 21 are preferably near the mid-point of the respective sides of each members 16 but nearer the long side which defines corner 17.

A webbing 22 loosely surrounds the cross members 18. The webbing 22 can be formed of any fabric, plastic, or other material which is strong enough to bear the weight of a person. A pillow 24, preferably segmented, can be placed on the uppermost portion of the webbing 22 to complete the seating section 14. When an individual sits on the pillow 24, the webbing 22 is stretched tightly about the cross members 18 to support the weight of the user. The two lower sides of the webbing 22 are stretched into straight line segments while the side of the webbing 22 on which the pillow 24 is disposed assumes an angled or curved configuration.

As is best seen in FIGS. 2 and 3, the chair 10 can be placed on the floor or other surface by either the longer sides of the frame 12 or the shorter sides. When the longer sides of the frame 12 are on the floor, the chair 10 provides a lounge-type chair which is most suitable for reclining. When the shorter sides of the frame 12 are on the floor, the chair 10 takes the form of a "side" chair useful primarily for sitting upright. Of course, when the frame 12 is rotated to alter the basic useage of the chair 10, the pillow 24 must be rearranged to remain on the uppermost surface of the webbing 22.

Referring now to FIGS. 4 and 5, the inventive pressure fitted connector 20 will be described. All of the connectors 20 are identical in design and operation. The connector 20, as can be seen, joins one of the plastic cross members 18 to one of the plastic frame members 16, the members 16 and 18 being perpendicular to each other. The frame member 16 has aligned holes 26 and 27 formed therein, along a line coincidental with the longitudinal axis of the associated cross member 18. The connector 20 itself comprises a cylindrical inner end portion 28, a cylindrical outer end portion 30, and a mating adaptive portion 32 between the inner and outer end portions 28 and 30. The inner end portion 28 has an outside diameter that is slightly less than the inside diameter of the cross member 18 so that the end portion 28 is easily received within one end of the tubular cross members 18, as shown in FIG. 4. The end portion 28 has a frusto-conical recess 34 formed therein, which recess 34 receives a mating frusto-conical plug 36. The plug 36 has outer contours which mate with the inner contours of the recess 34. The plug 36 further includes a cylindrical aperture 38 extending axially therethrough, the aperture 38 having an enlarged base chamber 40 formed in its wider end. The chamber 40 tightly receives a threaded nut 42 so as to hold the nut snugly therein, and hence to prevent rotation thereof. A bolt 44 having a threaded end portion is received through the aperture 38 and threadably engages the nut 42. The bolt 44 extends through a central aperture 46 formed in the outer end portion 30 and adaptive portion 32 of the connector 20. As can be seen, the aperture 46 is aligned with the aperture 38 in the plug 36.

In use, the cylindrical outer end portion 30 of the connector 20 is adapted to be received by the innermost and large hole 27 in the frame member 16. A rounded end surface 48 is provided on the outer end portion 30 to abut the inner wall surface portions of the member 16 around the smaller outermost hole 26. The bolt 44 extends through the outermost hole 26, the head portion lying external to the frame member 16. Rotation of the bolt 44 causes the threaded portion of the bolt to draw the threaded nut 42 and thus the plug 36 along the shaft of the bolt 44 in the direction of the head.

The inner end portion 28 of the connector 20 has slots 50 disposed 90° apart about the cylindrical outer surface thereof, the slots 50 extending through the portion 28 and into communication with the recess 34. The slots 50 allow the inner end portion 28 to expand outwardly upon movement of the plug 36 along the shaft of the bolt 44. Therefore, when the bolt 44 is "tightened," the plug 36 moves along the shaft of the bolt and thereby expands the inner end portion 28 against the inner cylindrical wall surfaces of the cross member 18. The inner end portion 28 of the connector 20 is thereby "pressure fitted" into the hollow open end of the cross member 18 and is thereby secured within the cross member. Circumferential ribs 51 are also provided on the surface of inner end portion 28 to better lock the connector to cross member 18.

With the inventive fittings, the stresses incident to the connection of the cross members 18 to the frame members 16 are evenly accomodated over the full contact surface between the outer surface of the inner end portion 28 and the inner wall surface of the cross member 18. This balancing of stresses is particularly important to the practical utility of the chair 10 since the frame 12 is of a hollow plastic material. Any local concentration of stresses in the cross member 18 could cause fracture of the plastic material, a situation minimized by the structure of the connector 20.

The adaptive portion 32 of the connector 20 is seen to include an annular shoulder 52 on its inner end which abuts against and mates with the annular end of the cross member 18. The outer surface 54 of the adaptive portion 20 is formed into an arcuate conformation, the curvature of which conforms to the radius of curvature of the outer surface of the frame members 16. Thus, the frame members 16 fit against the curved surfaces 54. Stresses on the frame members 16 at the juncture thereof with the cross members 18 are transmitted through the area of contact between the curved surfaces 54 and the curved wall surfaces of the frame members 16. Essentially, stresses are spread evenly over the joint through the connector 20 to prevent localized stresses in the tubular plastic members 16 and 18 on tightening of the bolt 44 to hold the members 16 and 18 against the connector 20.

It will be noted in FIGS. 4 and 5 that the outer end portion 30 of the connector 20 terminates in a curved region 48, the radius at curvature of which generally corresponds to that of the interior of frame members 16. Furthermore, the length of portion 30 is designed so that curved regions 48 lie in contact with the interior of frame members 16 while the curved surfaces 54 contact the outer surfaces of members 16. In this manner, once a connector 20 is inserted for fastening, tightening the bolt 44 serves discrete functions. First, the plug 36 is drawn toward the head of bolt 44, spreading the vanes (defined by slots 50) of inner end portion 28 against the interior of cross-member 18, with the ribs 51 locking the connector 20 to the cross-member 18. Secondly, tightening the bolt 44 locks the frame member 16 to the connector 20, transverse to cross-member 18. The frame member is compressed and held between the curved region 48 at portion 30 and the head of bolt 44. At the same time, deformation of frame member 16 is prevented by the coaction of the internal curved region 48 and the external curved surface 54 of the connector 20. Accordingly, the inventive connector serves well to distribute forces and prevent deformation. This is particularly important when connecting tubes of relatively fragile plastic.

Figure 6:
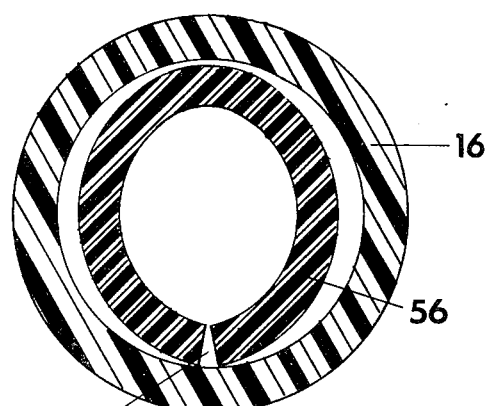
FIG. 6 is an end view in section of a connecting dowel used to join aligned tubular members together, the dowel being shown in its compressed state.
Figure 7:
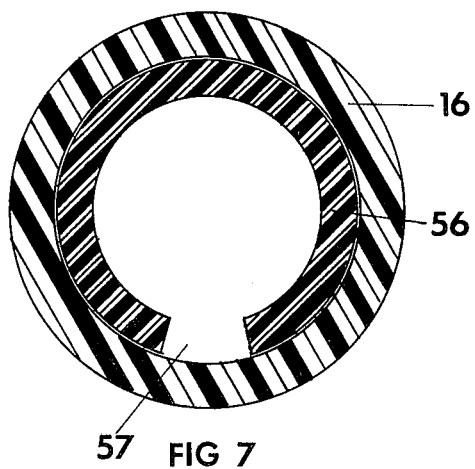
FIG. 7 is a view similar to FIG. 6, but showing the dowel expanded.

FIGS. 6 and 7 illustrate a hollow dowel 56 which is adapted for use in connecting aligned portions of tubular frame members 16. Referring back briefly to FIG. 2, it is to be seen that the frame member 16 has a joint 58 which results during manufacture when bending a length of tubing. The dowel 56 is compressed as shown in FIG. 6 and inserted partially into one open end of the frame member 16, the exposed end of the dowel 56 then being inserted into the open end of the other portion of frame member 16. The dowel 56 snaps into place within the member 16 to fit snugly against the inner wall surfaces thereof. Thus, the end portions of the frame member 16 which receive the dowel 56 are brought into abutting relation at the joint 58 and are so held by the dowel 56.

As can be seen in FIGS. 2, 6 and 7, the dowel 56 is of generally tubular design, but includes a relatively wide slit 57. This slit enables the dowel to be compressed during introduction to the adjacent open ends of frame members 16. The natural resiliency of the dowel 56 locks the dowel against the interior of frame members 16. Circumferential ribs may also be provided on the surface of dowel 56.

The inventive connector 20 is preferably of plastic, and though the connector would serve well when constructed of separate elements (28, 30 and 32) glued together, it is contemplated that these elements be injection moulded as an integral unit. The plug 36 would naturally be a separate element, but could be threaded internally so as to include the function of nut 42. If so threaded, it may be desirable that plug 28 be metallic for purposes of strength.

It is to be understood that the invention can be practiced in ways other than as described specifically herein. The scope of the invention is therefore intended not to be limited to the above, but only by the appended claims.

What is claimed is:

1. A connector for transversely joining first and second hollow tubular members, the connector comprising: a first extension having an outer surface conforming generally to the inner surface of said first member for extending axially thereinto, said first extension further having a frusto-conical recess formed therein and means in the outer surface of said first extension to permit expansion thereof; plug means having a frusto-conical outer surface conforming generally to the interior surface of said first extension; a second extension integral with said first extension but oppositely facing, said second extension having an outer end portion with a contoured surface adapted to abut in full contact with said second member and having an outer surface smaller than the inner surface of the second member and capable of extending transversely thereinto; and biasing means for simultaneously locking said second member to said connector and urging said plug means to maintain said first extension in expansive engagement with said first member.

2. The connector of claim 1, wherein said biasing means is a bolt, said bolt being adapted for transversely extending through a bore in said second member, with its head remaining external, and threadably engaging said plug means.

3. The connector of claim 1, wherein the extremity of said second extension remote from said first extension conforms to the interior of said second member.

4. The connector of claim 1, including abutment means integral with said first extension, having an exterior surface conforming generally to the outer surface of said first member and adapted to abut against an open end thereof.

5. The connector of claim 1, wherein said expansion means are slots disposed 90° apart and extending through said first extension.

6. A structural joint comprising a first hollow tubular member, a second hollow tubular member, and a connector, the connector including: a first extension with an outer surface conforming generally to the inner surface of said first member, said first extension extending axially into said first member and further having a frusto-conical recess formed therein and expansion means for permitting expansion thereof; plug means having a frusto-conical outer surface conforming generally to the recess of said first extension; an outer end portion facing away from said first extension and having a contoured surface adapted to abut in substantially full contact with the outer surface of said second member; a second extension integral with said first extension but oppositely facing, having an outer surface smaller than the inner surface of the second member and extending transversely thereinto; and biasing means for simultaneously locking said second member to said connector and urging said plug means to maintain said first extension in expansive engagement with said first member.

7. The structural joint of claim 6, wherein said biasing means is a bolt adapted to transversely extend through a bore in said second member, with its head remaining external thereto, and threadably engaging said plug means.

8. The structural joint of claim 6, wherein the extremity of said second extension remote from said first extension contacts and conforms to the interior of said second member.

9. The structural joint of claim 6, including abutment means integral with said first extension, having an exterior surface conforming generally to the outer surface of said first member and abutting against an open end thereof.

10. The structural joint of claim 6, wherein said expansion means are slots disposed 90° apart and extending through said first extension.

* * * * *